(12) United States Patent
Goodwin

(10) Patent No.: US 6,345,238 B1
(45) Date of Patent: Feb. 5, 2002

(54) LINEAR TEMPERATURE SENSOR

(75) Inventor: Shaun Goodwin, East New Market, MD (US)

(73) Assignee: Airpax Corporation, LLC, Frederick, MD (US)

( * ) Notice: Subject to any disclaimer, the term of this patent is extended or adjusted under 35 U.S.C. 154(b) by 0 days.

(21) Appl. No.: 09/364,464

(22) Filed: Jul. 30, 1999

Related U.S. Application Data

(60) Provisional application No. 60/113,096, filed on Dec. 21, 1998, and provisional application No. 60/129,089, filed on Apr. 13, 1999.

(51) Int. Cl.$^7$ .............................. G01K 1/20; H01L 31/04
(52) U.S. Cl. ....................... 702/130; 257/470; 327/512; 327/513
(58) Field of Search ................................ 327/512, 513; 702/130, 133; 257/470

(56) References Cited

U.S. PATENT DOCUMENTS

| | | | |
|---|---|---|---|
| 4,845,435 A | * 7/1989 | Bohan, Jr. .................... | 324/537 |
| 5,639,163 A | * 6/1997 | Davidson et al. ............ | 374/178 |
| 5,781,075 A | * 7/1998 | Bolton, Jr. et al. .......... | 331/176 |
| 5,838,187 A | * 11/1998 | Embree ........................ | 327/512 |
| 5,953,490 A | * 9/1999 | Wiklund et al. ............. | 388/811 |

FOREIGN PATENT DOCUMENTS

JP          7-202224        *  8/1995

OTHER PUBLICATIONS

INSPEC 2408926 "A Thermostat with silicon diodes" Nov. 1984.

Fuller, R.M, "A Simple Radiometer Using Diodes As Thermal Detectors", Am. J. Phys, vol. 41, No. 3, Mar. 1973.

Sargeant, Douglas, "Note on the Use of Junction Diodes as Temperature Sensors", Journal of Applied Meteorology, vol. 4, No. 5, Oct. 1965.

Strong, C.L., "An amateur's improved design for a home-made quartz crystal clock", Scientific American, vol. 204, No. 6, pp 181, 182, 184, 186, 188, 190 and 192, Jun. 1961.

Rakes, Charles; "Oscillator and Bridge Circuits", Popular Electronics, pp 82, 83 and 90, Mar. 1994.

"Selected Electronic Circuity", NASA SP–5046, 1966 (No month given).

Milnes, A.G., "Semiconductor Devices and Integrated Electronics", pp. 928–931 1980 (No month given).

Brinkman, Edward S., "IC diodes help deduce junction temperature", http://www.ednmag.com/ednmag/reg/1994/070794/14D19.htm.

Grove, A.S; "Physics and Technology of Semiconductor Devices", pp. 149–207, Chapter 6, John Wiley & Sons, New York 1967 (No month given).

* cited by examiner

Primary Examiner—Allan R. Wilson
(74) Attorney, Agent, or Firm—Milde, Hoffberg & Macklin, LLP

(57) ABSTRACT

A linear temperature sensor that incorporates passive bipolar semiconductor devices and is capable of high accuracy over a very wide temperature range. The passive bipolar semiconductor device splits a voltage drop between the bipolar semiconductor and a resistor, such that the voltage drop varies approximately linearly in negative dependence on temperature. Optionally the linearity may be improved by providing sufficient current to produce a self-heating effect which compensates for non-linear deviations in performance at low temperatures.

20 Claims, 6 Drawing Sheets

LINEAR TEMPERATURE SENSOR

This application is a provisional of No. 60/113,096 filed Dec. 21, 1998 which is a provisional of No. 60/129,089 filed Apr. 13, 1999.

FIELD OF THE INVENTION

The present invention relates to the field of temperature sensors, and more particularly to temperature sensors based on the intrinsic characteristics of semiconductor devices.

BACKGROUND OF INVENTION

The sensing of temperature is one of the fundamental requirements for environmental control, as well as certain chemical, electrical and mechanical controls. Often, by controlling a process based on a measured temperature, the efficiency or other parameter may be altered, typically to an optimum. However, where the temperature sensor itself is expensive, cumbersome, or requires substantial signal conditioning and processing, these factors weigh heavily against the sensing of every relevant temperature, and rather to employ the minimum number of temperature sensors possible.

Thus, the logistical cost of providing and operating the sensor to optimize the operation of the system or process is weighed against the potential gains in system efficiency. Therefore, as the sensor systems become less expensive, more reliable, more robust, and easier to deploy, the reasonableness of widespread deployment is enhanced.

There are two ways of looking at the efficiency (or gains in efficiency) of a process: first, one considers a particular apparatus, operating under particular conditions. Second, one looks at all examples of the class of process as a whole. In the first case, in order to justify reconfiguration of the process to gain efficiency, the efficiency gains must not only exceed the incremental costs of the reconfiguration, but also the administrative costs involved as well. Therefore, it is often difficult to justify any changes to a system or process unless the gains are substantial, or the value of improved performance is high. On the other hand, when one looks at multiple installations of the process, or the design of new processes for widespread distribution, even small changes in the cost, availability, robustness, or other characteristics of a component may result in change in engineering policy.

In particular, the known electrical temperature sensor technologies have shortcomings which limit widespread deployment. Thus, many common processes operate at suboptimally, resulting in inefficient energy utilization, increased greenhouse gas production, and possibly increases in other pollutants. Thus, by providing temperature sensors and control systems responsive thereto, many processes may be improved. These improvements result in reduced energy utilization and environmental benefits.

While the control systems are central to the improvements discussed above, the present availability of advanced microprocessors and embedded control systems typically allow any reasonable degree of complex control to be provided, and the cost of the control itself is not prohibitive. On the other hand, linearization of sensors poses certain problems even for these available control systems. The most critical problem is the fact that the linearization must often be calibrated to the sensor, therefore, a significant individual step must be taken for each sensor to set up the system properly, and further, replacement of sensors becomes difficult, requiring a recalibration. Thus, where a temperature sensor has an uncalibrated nonlinear output, a substantial additional cost is incurred.

Often, in order to control a real process, an actuator is required. These actuators are indeed typically expensive and have other significant costs as well; however, these same actuators may already be provided within the process or system, or may be justified based on improvements in efficiency or performance.

Of course, other kinds of sensors may provide gains; however, as a class, temperature sensors tend to be one of the most common and critical sensor classes employed, especially in systems which employ large amounts of energy, such as combustion processes or heavy electrical systems.

There are a number of known temperature sensing technologies which produce an electrical output. These include thermocouples, resistive temperature sensors, thermistors, and semiconductor sensors. Each of these technologies has different applicable physics and other characteristics, and therefore may have different applications.

In many applications, it is desired to have a passive, two terminal, linear temperature sensor. Ideally, of course, the sensor is linear, accurate and of low cost. However, most thermal sensing technologies have an exponential feature in their sensitivity curves. Therefore, these sensors are limited to a particular linear approximate operating range and environment of operation and possibly require linearization as well.

Further, it is also desirable to provide temperature sensors which require little or no calibration. Thus, for example, the thermocouple type sensors have well defined characteristics, and require little calibration. Likewise, resistive temperature devices (RTDs) require only simple calibration, with very well defined variations with temperature. Thermistors, on the other hand, are more difficult to calibrate and maintain in calibration.

Semiconductor temperature sensors come in a variety of types. Normally, under constant current, the voltage across a bipolar semiconductor junction (or indeed virtually any type of semiconductor diode) will vary exponentially. Likewise, under constant voltage across the junction (within the limits of the device), the current will vary exponentially. Therefore, typical semiconductor sensor systems seek to linearize this output, and indeed may produce a high quality output. However, this leads to four problems. First, the linearization circuitry is active, and therefore requires a power supply; second, the active electronics typically have a relatively constrained temperature operating range; third, these sensors can be expensive; and fourth, the linearization circuitry may require calibration. Thus, while there are well understood methods for compensating performance of non-linear temperature sensors to produce a linear output, these are not ideal for all purposes.

The so-called military range of temperatures, −50 to 125° C., is typically considered the full range of terrestrial environmental conditions. In an electrical system, the maximum temperature may exceed 125° C., for example 150° C., and in automotive environments, for example, sensors are sought which may reliably operate up to 200° C. In combustion systems, or other environments, the temperatures may extend substantially above this level. In terms of thermodynamics, this automotive range represents a significant range, i.e., 223 to 423° K, an almost 2:1 range. Therefore, sensors which have a temperature sensitivity which depends strongly on an exponential (or logarithmic) function of temperature are expected to exhibit substantial non-linearity over this range of temperatures.

Thermistors are typically formed of a semiconductor material, e.g., an n-type doped semiconductor material, without any significant bipolar junction. The semiconductor has an intrinsic and non-linear change in conductivity with temperature. While it is possible to use silicon semiconductor alloys as thermistors, the materials in common use have a significantly higher sensitivity to temperature, and thus produce a higher level output. Thermistors, may have a positive temperature coefficient (PTC) or a negative temperature coefficient (NTC), depending on the base material and doping. Compensation networks may be used to linearize the thermistor, but these may require individual calibration. Thermistors and their associated linearization components are difficult to calibrate to obtain high accuracy (and do not maintain calibration), and the devices may be subject to multivariate environmental influences, making stability poor. Thermistors, however, are inexpensive and typical devices offer a logarithmic temperature response over a range of about −65° C. to 150° C.

Another type of temperature sensor is an Resistive Temperature Device (RTD), which has a wide operating temperature range and high accuracy, but forms part of a very expensive sensor system. This system includes precision amplifiers and stable power supplies. It is noted that, since the voltage output of the RTD is relatively low level, extreme care must be taken to ensure that the circuitry outside the RTD element does not introduce errors, and therefore must be carefully temperature compensated.

Thermocouples have a wide operating range and the sensor elements are relatively inexpensive. However, thermocouple systems are not nearly as accurate as an RTD. So, a trade-off of price vs. accuracy and temperature range is posed. Thermocouple systems also require precision amplifiers and additionally require reference junctions, making the systems somewhat complex.

Active electronic devices tend to be far above the cost of passive devices, and typically do not reliably operate at temperatures above 125° C. Therefore, passive type materials are normally used in extended temperature range thermal sensors. These materials may be metals, semiconductors, resistors, or even chemical reactance's. Resistors and chemical type components (capacitors) are typically limited to a range of 150° C. to 175° C. Metals (thermocouples and RTDs) and some passive semiconductors can survive 200° C. environments, making them attractive candidates for industrial or automotive sensing applications.

In temperature sensing, initial accuracy and overall linearity are important in distinguishing temperature sensor quality. Certain types of metals (e.g., thermocouples, RTDs) are high quality temperature sensors, but the sensors can be expensive, and the outputs are low-level, requiring conditioning and amplification, which can itself require calibration and possibly introduce errors.

Passive and discrete semiconductor devices (such as diodes and transistors) are available having guaranteed operating ranges that extend up to 200° C. Semiconductor material has a "bulk resistance" property that effectively varies with temperature (i.e., the thermistor effect). These devices are designed to partially conduct at room temperatures, hence making them "semi" conductors. This property makes them useful in that the conductivity properties may be modulated or asymmetric.

Crystalline materials can be classified according to their bandgap. An insulator is a poor conductor since it requires a lot of energy, 5–8 eV, to excite the electrons enough to get to the conduction band. We can say that the width of the band gap is very large, since it requires that much energy to traverse the band gap, and draw the band diagram respectively. A metal is an excellent conductor because, at room temperature, it has electrons in its conduction band constantly, with little or no energy being applied to it. This may be because of its narrow or nonexistent band gap, the conduction band may be overlapping the valence band so they share the electrons. The band diagram would be drawn with $E_c$ and $E_v$ very close together, if not overlapping.

Semiconductors are materials which have properties between those of metals and insulators. The band gap is wide enough to where current is not going through it at all times, but narrow enough to where it does not take a lot of energy to have electrons in the conduction band creating a current. The distinction of whether a material is a useful semiconductor therefore depends on the operating temperature and expected performance.

A bipolar junction diode is created by forming a metallurgical junction between a semiconductor material having a set of impurities, called donor impurities, and a semiconductor material having a set of impurities, called acceptor impurities. The donors and acceptors differ in that the donor has a valence electron which, in a crystalline lattice, is easily released to ionize the atom, while the acceptor has a valence vacancy which, in the crystalline lattice, is easily filled with a free electron, ionizing the atom.

Under equilibrium conditions, electron-hole pairs are generated continually everywhere in a semiconductor, through a thermal-disassociation process. In the absence of an applied voltage, the electron-hole pairs recombine and therefore no net current flow results. However, when a negative voltage is applied to the n-region of a bipolar diode with respect to the p-region, the driving voltage will cause net diffusion of electron-hole pairs away from each other. In the steady state condition, all current flow will be represented by electron-hole pair recombination, as the sum of recombination and diffusion currents. It also follows that the net hole-pair recombination rate during conduction will exceed the quiescent value, at the same temperature. At low forward voltages through a bipolar junction, recombination effects predominate, while at larger forward voltages, diffusion effects predominate.

A useful analysis of bipolar junctions is provided at www.ece.utep.edu/courses/ee3329.Semiconductors Diode Currents:

A drift current in a bipolar junction results from electrons and holes responding to an applied electric field. Holes move in the direction of the electric field while electrons move opposite the electric field. This occurs as long as there are carriers available. Diffusion current is holes and electrons moving from areas of high concentration, where they are the majority carrier, to areas of low concentration, where they become minority carriers. This occurs until they are uniformly distributed. Unlike drift, diffusion takes place without an electric field being present.

In a pn junction diode, a band diagram that models the pn junction has band bending at the metallurgical junction. Band bending is caused by an applied electric field, which may be externally applied or as a result of non-uniform doping. In a pn junction, the electric field is produced when a p-type and an n-type semiconductor are brought together; therefore it is present even when it is in equilibrium. This means both drift current and diffusion current are present in equilibrium but the total current density J=0.

Carriers near the depletion region get caught in the electric field and quickly drift to the other side.

Applying a potential to the diode affects the current flowing through the diode. The potential barrier varies with the applied voltage $V_A$. If $V_A=0$, the diode is in equilibrium, if $V_A>0$ it is forward biased, and if $V_A<0$ it is reverse biased. Drift current and diffusion current are present even though J=0 in equilibrium. This is because for every electron that diffuses from the n-side to the p-side there is an electron that drifts from the p-side to the n-side, and vice versa. The two currents balance each other and the total current density J=0.

When the diode is forward biased, $V_A>0$, the potential barrier is still present, but it is less steep. A smaller potential hill means electrons from the n-side and holes from the p-side need less energy to climb the hill, therefore diffusion current increases. This current is positive, electrons flowing opposite the electric field produce a positive current and holes flowing with the electric field also produce a positive current. Under forward biasing, the applied voltage needs only to be increased by tenths of a volt to see a significant change in current. As the voltage is increased slightly, the current increases exponentially because of the increasing number of carriers that have enough energy to cross the junction. Majority carrier concentrations in a typically doped silicon semiconductor at room temperature are around the magnitude of $10^{17}/cm^3$, so if even one third cross the junction, this represents a relatively large current.

When the diode is reverse biased, $V_A<0$, the potential hill gets steeper, and thus the probability of a majority carrier crossing decreases. By setting $V_A$ just a few tenths of a volt less than zero, the potential hill gets steep enough that the majority carriers do not have enough energy to climb it and make it to the other side. This causes the diffusion current to become negligible.

$V_A$ does not affect drift current. It doesn't matter how steep or flat the potential hill is, as long as there is an electric field and available carriers (ionized dopants don't count) drift will remain the same. The current produced is negative, and electrons are flowing with the electric field producing a negative current and holes are flowing against the electric field also producing a negative current. The reverse bias current, i.e., the current present in a reverse biased condition, and before breakdown, is expected to be small, unlike forward bias current, because it depends on the minority carrier drift.

When the diode is forward biased, drift current is present, but because diffusion current grows exponentially, it dominates. The total current flowing through the depletion region under forward biasing is made up of mostly majority carrier diffusion. When the diode is reverse biased diffusion is negligible, but drift remains constant. The total current flowing through the depletion region under reverse biasing is made up of mostly of minority carrier drift.

Effect of Varying $V_A$ $V_{bi}$ is the built in voltage in a pn-junction diode in equilibrium. $V_A$ is the voltage that is applied to the diode terminals. Applying $V_A>0$, the diode is forward biased. Reverse bias is when $V_A<0$. The diode is in equilibrium when $V_A=0$. $V_A$ is considered positive when the higher potential is applied to the p-side of the diode. Variations in $V_A$ result in changes to $x_p$ and $x_n$, therefore changing the width of the depletion region. The equations for charge density, electric field and potential all include the boundaries of the depletion region. $x_p$ and $x_n$ so they all change as well. The width increases with $V_A<0$ and decreases with $V_A>0$.

The electric field, E, is also affected by varying the depletion region. There's a larger to electric field when the diode is reverse biased since there is a wider depletion region. A smaller one with forward biasing corresponding to a narrower depletion region. Charge density, $\varrho$, only depends on the doping and charge, however, the relevant region, the depletion region width between $x_p$ and $x_n$, varies with $V_A$.

Minority carrier diffusion equations

Minority carrier diffusion equations (MCDEs) are equations used to model semiconductors under special circumstances. They are derived from the continuity equations after making a series of assumptions that therefore limit the applicability of the MCDEs. At the same time, MCDEs can be used in a large number of situations to derive closed-form, analytical solutions that describe carrier concentrations and currents. When semiconductors are being used (which is when they are most interesting) processes are constantly occurring within, caused by the outside influences like change in temperature, the presence or absence of light, or an applied voltage. These may cause carrier drift, diffusion, and recombination-generation and affect the carrier concentration within the semiconductor as a function of time or space as the semiconductor attempts to bring itself back to equilibrium. After making several assumptions, the continuity equations are simplified to the minority carrier diffusion equations (MCDEs).

Minority carrier diffusion equations:
$$\frac{\partial \Delta n_p}{\partial t} = D_N \partial^2 \Delta \frac{n_p}{\partial x^2} - \frac{\Delta n_p}{\tau_n} + G_L$$
$$\frac{\partial \Delta p_n}{\partial t} = D_P \partial^2 \Delta \frac{p_n}{\partial x^2} - \frac{\Delta p_n}{\tau_n} + G_L$$

The MCDEs can be further simplified to obtain a less complex differential equation, with respect to either time or space. The end result of using the MCDEs is to obtain the rate of change in minority carrier concentration with respect to time or space within a semiconductor.

The continuity equations take into account all of the processes that simultaneously occur within a semiconductor, e.g., drift, diffusion, and recombination-generation. These carrier actions change the carrier concentration in the semiconductor as a function of time and space, and because carriers transport a charge, a current will result.

Continuity Equations:
$$\left(\frac{\partial n}{\partial t} = \frac{1}{q}\nabla \cdot J_N + \frac{\partial n}{\partial t}\bigg|\right)_{\substack{thermal\\R-G}} + \frac{\partial n}{\partial t}\bigg|_{\substack{other\\processes}}$$
$$\left(\frac{\partial p}{\partial t} = -\frac{1}{q}\nabla \cdot J_P + \frac{\partial p}{\partial t}\bigg|\right)_{\substack{thermal\\R-G}} + \frac{\partial p}{\partial t}\bigg|_{\substack{other\\processes}}$$

The continuity equations are generally considered too complicated to use except on a computer as difference equations derived from an ordinary partial differential equation. This system provides two equations and three unknowns, n, p, and V. With Poisson's equation, the third equation is available to solve the equations under various circumstances.

Poisson's Equation:
$$\nabla \cdot \vec{E} = \frac{\rho}{\varepsilon_0} = -\nabla^2 V$$

The forward current-voltage characteristic of a bipolar diode ("the law of the junction") is given by the formulas:

$I_F = I_{rec} + I_{diff}$ $I_{rec} = -\frac{1}{2}q\ n_i/\tau W e^{q|V_F|/2kT} Aj$ $I_{diff} = -qDn_i^2/(C_B L) W e^{q|V_F|/kT} Aj$ wherein:

$I_F$ is the forward current;

$I_{rec}$ is the recombination current;

$I_{diff}$ is the diffusion current;

½q $n_i/\tau W A_j$ ($I_{gen}$) is the magnitude of current due to generation within the depletion region;

q D $n_i^2/(C_B L)$ $A_j$ ($I_{diff}$) is the diffusion current for carriers in an opposite type region reaching the edge;

$-q$ is the charge of an electron;

$\tau$ is the effective carrier lifetime within a reverse biased depletion region;

$n_i$ is the intrinsic carrier concentration;

$C_B$ is the net impurity concentration $\equiv |N_D - N_A|$;

W is the total depletion region width;

L is the diffusion length of carriers;

$V_F$ is the forward voltage;

$A_j$ is the cross sectional area of the p-n junction;

k is Planck's constant; and

T is the temperature expressed in Kelvins.

These equations are often simplified to the empirical formula:

$$I_F \, e^{q|V_F|/mkT}$$

wherein m is an empirical factor between 1 and 2, depending on whether pure diffusion current (1) or pure recombination current (2) predominates.

The Ideal Diode Equation:

In analyzing a diode, there are three relevant regions: the quasineutral p-region, the quasineutral n-region, and the depletion region. The quasineutral p-region is from the edge of the depletion region, $-x_p$, to the edge of the diode, which is assumed to be an infinite distance away from $-x_p$. The quasineutral n-region extends from the edge of the depletion region, $x_n$, to the edge of the diode, which is assumed to be an infinite distance away from $x_n$. In the quasineutral regions there is no electric field. This allows use of the MCDEs to find the current densities in these regions.

By assuming the edges of the diode are an infinite distance away from any actions taking place in the depletion region, this allows an assumption that there isn't any variation of carrier concentrations as we get to the edges of the diode:

$$\Delta n_p(x \to -\infty) = 0$$

$$\Delta p_n(x \to +\infty) = 0$$

At the edges of the depletion region, $-x_p$ and $x_n$, equilibrium conditions do not prevail so we must use the "law of the junction".

$$np = n_i^2 e^{\frac{qV_d}{kT}}$$

To find the boundary conditions at $-x_p$ and $x_n$ we use the law of the junction and solve for the minority carrier in each region to obtain:

$$\Delta n_p(-x_p) = \frac{n_i^2}{N_A}\left(e^{\frac{qV_d}{kT}} - 1\right)$$

$$\Delta p_n(x_n) = \frac{n_i^2}{N_D}\left(e^{\frac{qV_d}{kT}} - 1\right)$$

Using these assumptions, the MCDE and J in the quasineutral regions simplify to:

| | | |
|---|---|---|
| On the $n$-side: $x >= x_n$ | $D_P \frac{d^2 \Delta p_n}{dx^2} - \frac{\Delta p_n}{\tau_p} = 0$ | $J_p = -q D_p \frac{d \Delta p_n}{dx}$ |
| On the $p$-side: $x <= -x_p$ | $D_N \frac{d^2 \Delta n_p}{dx^2} - \frac{\Delta n_p}{\tau_n} = 0$ | $J_N = q D_n \frac{d \Delta n_p}{dx}$ |

Using the boundary conditions, the MCDE's may be solved for each quasineutral region.

$$\Delta n_p(x) = \frac{\frac{n_i^2}{N_A}\left(e^{\frac{qV_d}{kT}} - 1\right)}{e^{\frac{-x_p}{L_N}}} e^{\frac{-x}{L_N}}$$

$$\Delta p_n(x) = \frac{\frac{n_i^2}{N_D}\left(e^{\frac{qV_d}{kT}} - 1\right)}{e^{\frac{-x_n}{L_P}}} e^{\frac{-x}{L_P}}$$

To find the current densities of the quasineutral regions, we take the derivatives of $\Delta n_p$ and $\Delta p_n$ and plug them into the equations for $J_P$ and $J_N$. Next, we evaluate $J_P$ and $J_N$ at the depletion region edges, $-x_p$ and $x_n$ respectively, to obtain the current density in each region. By adding them together, we obtain the current density in the depletion region.

| | | |
|---|---|---|
| Derivatives of $\Delta n_p$ and $\Delta p_n$: | $\frac{d\Delta n_p(x)}{dx} = \frac{\frac{n_i^2}{N_A}\left(e^{\frac{qV_d}{kt}} - 1\right)}{L_N e^{\frac{-x_p}{L_N}}} e^{\frac{x}{L_N}}$ | $\frac{d\Delta p_n(x)}{dx} = \frac{\frac{n_i^2}{N_D}\left(e^{\frac{qV_d}{kT}} - 1\right)}{L_p e^{\frac{-x_p}{L_p}}} e^{-\frac{x}{L_p}}$ |
| $J_P$ and $J_N$ at the depletion region edges: | $J_N = qD_N \frac{n_i^2}{N_A} \frac{\left(e^{\frac{qV_d}{kt}} - 1\right)}{L_N}$ | $J_P = qD_P \frac{n_i^2}{N_D} \frac{\left(e^{\frac{qV_d}{kt}} - 1\right)}{L_P}$ |

$$J = J_N(-x_p) + J_P(x_n) = q\left(\frac{D_N}{L_N}\frac{n_i^2}{N_A} + \frac{D_P}{L_P}\frac{n_i^2}{N_D}\right)\left(e^{\frac{qV_d}{kT}} - 1\right)$$

The current density may be simplified to a current by multiplying the current density (J) by the cross sectional area (A) of the diode at the depletion region, to obtain the ideal diode equation:

$$I = I_0\left(e^{\frac{qV_d}{kT}} - 1\right)$$

$$I_0 \equiv qA\left(\frac{D_N}{L_N}\frac{n_i^2}{N_A} + \frac{D_P}{L_P}\frac{n_i^2}{N_D}\right)$$

In seeking to understand the full effect of temperature on the properties of a bipolar device, the effect on individual aspects of the bipolar junction must be understood.

Temperature directly impacts Carrier concentrations, by impacting the Fermi distribution, the band gap, donor and acceptor ionization, intrinsic carrier concentration, and carrier energy.

The effect of Temperature on the Fermi Distribution

The Fermi function is a probability distribution function. The Fermi function determines the probability that an energy state (E) is filled with an electron when the material we are working with is under equilibrium conditions. The Fermi level ($E_F$) helps determine carrier distributions. Energy states above the Fermi level have a low probability of being filled with electrons and energy states below the Fermi level have a high probability of being filled with electrons, with energy states equal to $E_F$ having a 50% probability of that state being filled.

The Fermi function represents the probability of an energy state being occupied:

$$f(E) = \frac{1}{1 + e^{\frac{(E-E_F)}{kT}}}$$

In a band diagram, the position of the Fermi level determines which carrier dominates. If the semiconductor contains more electrons than holes, n-type material, the Fermi level is positioned above mid gap. If holes are more abundant than electrons. p-type material, $E_F$ is positioned below mid gap. When the electron and hole concentrations are approximately equal, intrinsic material, $E_F$ is positioned at mid gap. The Fermi function, or level, also varies with temperature and carrier concentration.

Intrinsic semiconductor $$E_F = E_i = \frac{E_c + E_V}{2} + \frac{3}{4}kT\ln\left(\frac{m_p^*}{m_n^*}\right)$$

$n_o = p_o$ n-type semiconductor $$E_F - E_i = kT\ln\left(\frac{N_D}{n_i}\right)$$

$N_D \gg N_A$, $N_D \gg n_i$ p-type semiconductor $$E_i - E_F = kT\ln\left(\frac{N_A}{n_i}\right)$$

$N_A \gg N_D$, $N_A \gg n_i$

The Fermi energy $E_F$ on the band diagram is thus a function of temperature and carrier concentration.

The effect of temperature on the band gap

As temperature increases, the band gap energy decreases, because the crystal lattice expands and the interatomic bonds are weakened. Weaker bonds means less energy is needed to break a bond and get an electron in the conduction band. The relationship between temperature and the band gap energy can be seen by the following equation:

$$E_G(T) = E_G(0) - \frac{\alpha T^2}{(T + \beta)}$$

$E_G(0)$ is the limiting value of the band gap at 0 K. $\alpha$ and $\beta$ are constants chosen to obtain the best fit to experimental data. In this case, it is seen that the band gap energy is a binomial function of temperature The effect of temperature on donor and acceptor ionization A donor is an element with typically one more valence electron than the element that forms the semiconductor. An acceptor is an element with typically one fewer valence electron than the element that forms the semiconductor. An ion is an electrically charged atom or group of atoms. Ionization occurs when an electron is removed from or added to an atom, in this case it would be the dopant atoms.

The donor's extra electron is weakly bound and needs very little energy, thermal or otherwise, to break the bond and become a free electron. As temperature is increased, more and more of these bonds are broken, until all the donors are ionized, producing an increase in electron concentration. At room temperature, we assume all the donors are ionized.

At 0 K the electrons at the donor sites of a doped silicon semiconductor do not receive enough energy to make it to the conduction band, so the ratio between the majority carrier concentration and the doping concentration $n/N_D=0$. As the temperature is increased, more donor electrons make it to the conduction band, but at temperatures below 150 K all the donor sites have not been ionized so the ratio $n/N_D<1$ and the majority carrier concentration is made up of the donor electrons that have made it to the conduction band. At room temperature, we assume all the donors are ionized, meaning all donor electrons are in the conduction band, so the ratio $n/N_D=1$ and the majority carrier concentration is made up of the donor electrons. At very high temperatures, above 500 K, electrons from the valence band receive enough energy to make it to the conduction band and out number the electrons from the donor sites, so the ratio $n/N_D>1$ and the majority carrier concentration is now made up of electrons from the valence band in the conduction band, as in an intrinsic semiconductor.

Acceptors in doped silicon semiconductors have one fewer valence electron than the neighboring semiconductor atoms and will readily accept an electron in order to completely bond. Very little energy is needed for an electron to travel to one of the acceptor sites and be trapped. As the temperature is increased, more electrons become trapped in acceptor sites, until all the acceptors are ionized, causing the hole concentration to increase. At room temperature, we assume all the acceptors are ionized.

At 0 K the electrons in the valence band do not receive enough energy to jump to an acceptor site and create a hole, so the ratio $p/N_A=0$. At temperatures below 150 K the ratio $p/N_A<1$ because all the acceptor sites have not been ionized, so the majority carrier concentration is made up of the holes left behind by trapped electrons in the acceptor sites. At room temperature we assume all the acceptors have been ionized. The ratio $p/N_A=1$ because the majority carrier is made up of the holes created by the ionized acceptors. At very high temperatures, above 500 K, the ratio $p/N_A>1$ because the holes created by electrons from the valence band jumping to the conduction band out number the holes that had been created by acceptors, so the majority carrier concentration is made up of holes created by valence electrons in the conduction band, as in an intrinsic semiconductor.

In some exotic or unusual semiconducting materials, higher temperatures are necessary to provide sufficient energy such that most of the donor sites or acceptor sites are ionized.

The effect of temperature on intrinsic carrier concentration

In an intrinsic semiconductor, for every electron created, a hole is created also, $n_0=p_0=n_i$. For an electron-hole pair to be created in an intrinsic semiconductor, a bond must be broken in the lattice, and this requires energy. An electron in the valence band must gain enough energy to jump to the conduction band and leave a hole behind. $n_i$ represents the intrinsic carrier concentration, or we can see it as the number of bonds broken in an intrinsic semiconductor.

As the temperature is increased, the number of broken bonds (carriers) increases because there is more thermal energy available so more and more electrons gain enough energy to break free. Each electron that makes it to the conduction band leaves behind a hole in the valence band and there is an increase in both the electron and hole concentration. As the temperature is decreased, electrons do not receive enough energy to break a bond and remain in the valence band. If electrons are in the conduction band they will quickly lose energy and fall back to the valence band, annihilating a hole. Therefore, lowering the temperature causes a decrease in the intrinsic carrier concentration, while raising the temperature causes an increase in intrinsic carrier concentration.

Equilibrium Carrier Concentrations

Once we know how to determine the carrier distribution, we can find the carrier concentration by integrating over all energies:

Electron concentration:

$$n = \int_{E_c}^{\infty} g_c(E)f(E)dE$$

Hole concentration:

$$p = \int_{-\infty}^{E_v} g_v(E)[1-f(E)]dE$$

These integrals may be expressed as:
Electron concentration:

$$n_0 = n_i e^{E_F-E_1/kT}$$

Hole concentration:

$$p_0 = n_i e^{E_F-E_1kT}$$

with the $n_o p_o$ product relationship:

$$n_0 p_0 = n_i^2$$

These equations are only valid when the semiconductor is in equilibrium and nondegenerate $E_v 3\ kT \leq E_F \leq E_c-3\ kT$. Nondegeneracy of a semiconductor means that the Fermi level, $E_F$, is more than 3 kT from any of the states for which we are counting electrons.

The effect of Temperature on Carrier energy
Carrier energy, $$\frac{1}{2}mv^2 = \frac{3}{2}kT,$$

or, in words, the average kinetic energy of an electron in a solid is linearly proportional to the temperature of the solid. For room temperature, we find that the average velocity of a free electron is approximately $10^7$ cm/sec.

Thus, it is seen that the forward current will strongly depend on temperature T, however, the actual manner in which an actual diode will respond to changes in temperature is difficult to analyze. It is noted that some of the other variables in the stated equations are also temperature sensitive, such as $\tau$ and $n_i$, while others vary with the applied voltage $V_F$, such as W. In terms of the simplified equation, the factor m will vary with both $V_F$ and T.

Based on these physical properties, as well as empirical data, it was therefore not understood in the art that a bipolar diode would be useful over an extended temperature range as a two-terminal type linear temperature sensor, but rather would have a generally exponential response, requiring linearization for accurate extended range temperature measurements. Therefore, while bipolar semiconductor diodes have been used as temperature sensors, and especially for temperature compensation, the systems typically operate with the diode subjected to a constant current or a constant voltage, resulting in an exponential (non-linear) response.

Since an exponential to linear conversion (by a digital processor) or compensation (by an analog network) is reasonable, the art teaches that the bipolar junction be held under such conditions that its output response with temperature is strictly exponential, with a strict inverse exponential function applied to linearize the output. In contrast, where the presumption of strict exponential response is not validated, these other types of non-linearities may require multipoint calibration routines, complex lookup tables, and high order interpolation to produce useful results.

The art therefore seeks a simple, low cost, linear high level output, extended range temperature sensor.

SUMMARY AND OBJECTS OF THE INVENTION

The present inventor has discovered that, under certain conditions of operation, a bipolar semiconductor junction can be employed to produce a high level, extended temperature range output. Further, these principles do not require exotic semiconductors for common measurement problems.

The preferred sensor provides a fixed impedance in series with one or more bipolar junctions. The series network is subjected to a constant voltage, with the output taken from the common node. By selecting the appropriate operating point, a semiconductor bipolar diode sensor with a highly accurate linear variation with temperature is obtained, with a high level voltage output. In view of the governing physical equations, discussed above, this is surprising.

This sensor may readily be incorporated into control systems, said control systems comprising at least one temperature sensor, a control, and an actuator, the control altering a state of the actuator in dependence on the output of the temperature sensor.

Since the temperature sensor according to the present invention produces a high level output from a robust two terminal device, the sensor may be distributed in harsh environments, such as under the hood of an automobile, or even within the engine or transmission itself. In fact, a principal cost of such distributed sensors is the cabling and connectors, rather than the sensor or interface. Therefore, another aspect of the invention provides an integral cable connector with the sensor package to reduce installation labor and parts. The invention also provides a sensor integrated with a cable, thereby eliminating a required connector between the sensor and the cable connecting to the control system.

Typically, internal combustion engine management controls read a few temperatures from operating components, for example aggregate coolant temperature, aggregate oil temperature, and intake manifold air temperature. However, there are a number of other engine components and operational parameters which vary base on temperature. For example, braking systems have an optimal temperature operating range, and abnormal temperatures may be indicative of particular conditions, such as partially engaged brake or abnormal friction conditions. Therefore, by monitoring the temperature of each brake rotor, each brake pad, or the hydraulic brake fluid near each brake, valuable information may be obtained. The incremental cost is relatively low, since there is presently a trend to provide sensors within each brake pad to sense pad wear, and therefore a consolidated cable harness may be employed, or the present sensor integrated with the wear sensor.

Likewise, the viscosity of fluid within a transmission may greatly affect its operation. However, this temperature is rarely measured, based on the presumption that at "normal" operating temperatures, this viscosity will be within a "normal" range, and that the gains to be made are small, and under limited circumstances. However, there is a significant cost in designing a transmission which meets these presumptions. By providing temperature sensors within the transmission, the existing controls may be more accurately driven, while the mass o the transmission reduced. For example, a typical hydraulic automatic transmission should remain within acceptable operating parameters for an extended duration under worst case environmental and operating conditions. Therefore, the transmission must be overbuilt for normal driving conditions and sporadic worst case conditions. Worse yet, if engineering presumptions are made regarding statistical worst case conditions seen in actual practice, a number of failures will occur, as expected by the statistical margin. If, however, critical parameters of the transmission were monitored, the control system operation may be altered to reduce strain on the system and/or a warning issued to the driver that a strenuous condition exists, allowing sufficient time to avoid damage to the system. Thus, the design of the transmission may more accurately represent the normal needs, without compromising the range of utility. Further, by monitoring temperature, more fuel efficient or improved performance driving modes may be employed, within the limits of system operation. Since the transmission is a relatively large and heavy automotive component, a reduction in weight or improvement in efficiency or performance may be significant both for fuel efficiency and for overall vehicle design.

Typically, a combustion management system for an internal combustion engine provides an aggregate control system for all cylinders, with, for example, a knock sensor to prevent operation of any cylinder in an unsafe mode. Therefore, the engine is forced to operate at the limits of the most vulnerable cylinder, even though the cylinders each operate in parallel. One factor which influences knock sensitivity (and indeed is influenced by operating mode) is cylinder jacket or head temperature. While it might be possible to measure cylinder exhaust temperature or cylinder internal temperature, these temperatures are much higher, represent a hostile environment for any sensor, and may not represent to true relevant factor. Typical internal combustion engines, however, do not provide a temperature sensor for each cylinder jacket because of the cost and complexity. However, by providing a sensor according to the present invention, at least the cost issue is addressed. In controlling the engine, both the amount of from a port injection system and the spark timing may be varied, thus optimizing combustion within each cylinder. Further, in some engine types, the valve timing may also be varied on a cylinder-by-cylinder basis. In measuring the cylinder jacket temperature, the conditions within each cylinder may be estimated, thereby allowing individual control. Typically, the sensor would be located within a coolant flow passage near the cylinder wall, although other locations are possible.

Another area of application of the present temperature sensor is in heating-ventilation and air conditioning (HVAC) systems. These HVAC systems require environmental sensors. Typically, a single sensor is provided per zone, each zone being defined by an actuator. However, the placement of the temperature sensor is typically a compromise between summer and winter needs, as well as ergonomics of placement of the thermostat, which typically houses the temperature sensor. According to the present invention, each zone may be provided with a number of temperature sensors. The control, e.g., the zone thermostat, may be remote from at least one temperature sensor. According to the present invention, since the temperature sensor is fundamentally a two wire device, with a high level linear output and high accuracy, remote sensors may be modular and replaceable, increasing versatility.

The temperature sensor according to the present invention also finds application in combustion processes, for example furnaces. In these systems, combustion temperature may provide a significant control parameter. Measurement of this combustion temperature, however, exposes a temperature sensor to a hostile environment. Therefore, it is advantageous to measure a combustion heat (e.g., temperature of heat exchanger), or flue temperature, or both. The present sensors have sufficient operating range to reliably sense such temperatures.

The temperature sensor according to the present invention has a temperature range of operation which exceeds that of traditional active electronic devices formed of silicon integrated circuits. It has been further found that the accuracy of the system exceeds that of typical active devices over the same range, and is cost competitive with other passive devices.

A preferred embodiment of the present sensor is constructed as one or more forward biased silicon bipolar diodes placed in series. A constant voltage is placed across the diodes in series with a resistor (a low temperature coefficient impedance), to provide a current of about 85 $\mu A$ at room temperature. The output is read as the voltage across the diode string. The preferred diode is a 1N4148 type, which has a glass package. The "glass" package diodes are the only diodes available today, at low cost, that can provide a 200° C. operating range; however, other package styles or raw wafers may be employed as appropriate.

Bipolar diodes (i.e., diodes having a junction of p and n type material which results in an assymetric current voltage response curve) are typically available in germanium and silicon, although a number of other diode types are available, including organic, group III–V crystals, silicon carbide, LED type materials, and many other which are generally considered unsuitable for active electronics. Germanium diodes (commonly used years ago in radio frequency circuits) have a forward voltage drop of approx. 0.2 volts at room temperature. Silicon diodes have a forward voltage drop of approx. 0.6 volts at room temperature. Typical light emitting diodes have a forward voltage drop of between 1.6 and 2.2 volts at room temperature.

A preferred embodiment of the invention therefore provides four 1N4148 silicon bipolar diodes in series, with a resistor having about 35 kΩ resistance. A capacitor is optionally placed across the sensor, for example a 0.001 μF ceramic type, to reduce noise, e.g., thermal noise. The sensor is thus presented as a two-terminal device. This embodiment was found, over a range of –40 to 150 ° C. to have an output voltage of 2.53 to 0.77 Volts, with a maximum error from ideal of 0.011 volts, and a maximum error of 0.62%. Of course, it is understood that the sensor may consist of any number of diodes in series, depending on the desired output level.

In order to reduce errors at lower temperatures, it is also possible to use a lower value resistor, for example a 17.5 kΩ or 5 kΩ resistor, to provide a small degree of self-heating. The optimal amount of self-heating will, of course, depend on the thermal impedance of the packaging and surrounding. This may be empirically determined. It is also possible to provide a shunt resistor, which will reduce (and thereby allow adjustment or calibration of) the responsivity of the sensor, and possibly to provide self heating as well, depending on the proximity to the sensing element(s).

In order to understand this, one has to understand that a diode has three continuous regions defining normal operating states. One is the 'OFF' mode. In this state little or no forward bias current applied, and the recombination current predominates. Two, is the 'ON SATURATED STATE'. Here, the diode has sufficient forward bias current and voltage to go into a complete conduction or saturation state, in which the diffusion current predominates. Third is the "LINEAR STATE", in which the diode is not 'OFF' but nor fully turned 'ON' or saturated, and therefore resides between the two extremes. In this linear state. the diode may be operated with variable voltage and current, to produce a linear change in output with respect to changes in temperature.

It is therefore seen that, as an aspect of the present invention, that the diode is biased in a regime where higher order effects counteract the exponential nature of the forward voltage drop with change in temperature, resulting in a linear reaponse. It is also seen that the bias current is relatively low, thus keeping the power dissipation, and therefore self-heating, of the sensor within a tolerable range.

It is noted, for example, that certain exotic semiconductors have larger forward voltage drops, and might therefore be expected to have greater sensitivity to temperature, in mV/°C. However, the operating current in these devices, for example light emitting diodes, generates a significant heat load, altering the output of the device. This is not a theroretical limitation on the use of exotic semiconductors, but does pose practical limitations on the availability of useful low cost sensors. Further, as stated above, a high temperature package, for example glass, is important for obtaining reliable high temperature operation of the sensor, and only a limited number of commercially available devices are available in such packaging. Another set of factors in the selection of useful devices for the temperature sensor is the size, thermal inertia, and heat transfer coefficient of the device package. In a sensor intended to have rapid response, relatively large ceramic or metal cases would reduce the speed of response of the sensor.

As the temperature changes, the diode properties change in accordance with $I_F e^{q|V_F|/mkT}$, with both the numerator $V_F$, and denominator m and T of the exponential term varying with temperature. Because the device is operated with a forward current which (except at the limits of operation) is outside the operating region at which $I_{\mathit{diff}}$, the diffusion current, predominates (e.g., forward voltage drop $V_F$ of about 0.6 V for a silicon diode), it is seen that the factor m will vary.

Thus, while may different types of bipolar semiconductor junctions will have an analogous response to temperature, the various operating and implementation considerations narrow the practical choices considerably, especially where standard device types are to be employed. It is therefore understood that the semiconductor device configurations for custom made sensing devices according to the present invention are less constrained.

It is believed that the present effects are characteristic of bipolar semiconductor diodes in general, and that over a limited temperature range and operating current selection, linear temperature sensing performance may be obtained. The present invention is thus not limited to silicon semiconductors, or axial junctions. Thus, germanium, gallium arsenide (of other group III–V semiconductor materials), silicon germanium alloy, silicon carbide. gallium nitride, and less common materials, such as those employed to fabricate light emitting diodes and semiconductor lasers, and organic semiconductors, may be used, including low bandgap and high bandogap semiconductors. Axial, planar, thin film semiconductors, semiconductor on insulator, and buried junction devices may all be employed. Further, Schottky devices may also be employed. In order to provide a high voltage level output, the semiconductors may be "stacked" within a single device. Therefore, the invention is not limited to discrete single junction bipolar diodes. As stated above, the present invention does not require active performance of the sensor, nor that the diode have useful reverse voltage blocking performance. Thus, non-traditional semiconductor materials may be used, for example having useful performance at temperature extremes or over a more extended temperature range.

It is therefore an object of the present invention to provide a temperature sensor formed of a two-terminal passive bipolar semiconductor device, wherein an extended range high level linear response is produced.

It is a further object of the invention to provide a bipolar semiconductor temperature sensor, wherein a forward bias current follows the following relation $$I_F e^{q|V_F|/mkT}$$

and therefore the forward bias voltage follows the relation $$ln(I_F) q|V_F|/mkT$$

or $$|V_F| ln(I_F)mkT/q$$

wherein the operating point is biased set such that the factor m offsets the change in forward current $I_F$.

It is also an object of the invention to provide a linear response output from an intrinsic logarithmic response semiconductor sensor by controlling a current through the sensor, such that over the range of sensor response, the output is linearized. Such sensors may sense temperature, chemical species, light, or other environmental variable.

It is a still further object of the invention to provide a passive bipolar semiconductor device temperature sensor in which a voltage drop split between the bipolar semiconductor and a resistor varies approximately linearly in negative dependence on temperature. Optionally, the linearity may be improved by providing sufficient current to produce a self-heating effect which compensates for non-linear deviations in performance at low temperatures.

There and other objects will become apparent from a review of the Detailed Description of the Preferred Embodiments.

BRIEF DESCRIPTION OF THE DRAWINGS

These and further objects and advantages of the invention will be more apparent upon reference to the following specification claims and appended drawings wherein:

DETAILED DESCRIPTION OF THE PREFERRED EMBODIMENTS

Figure 1:
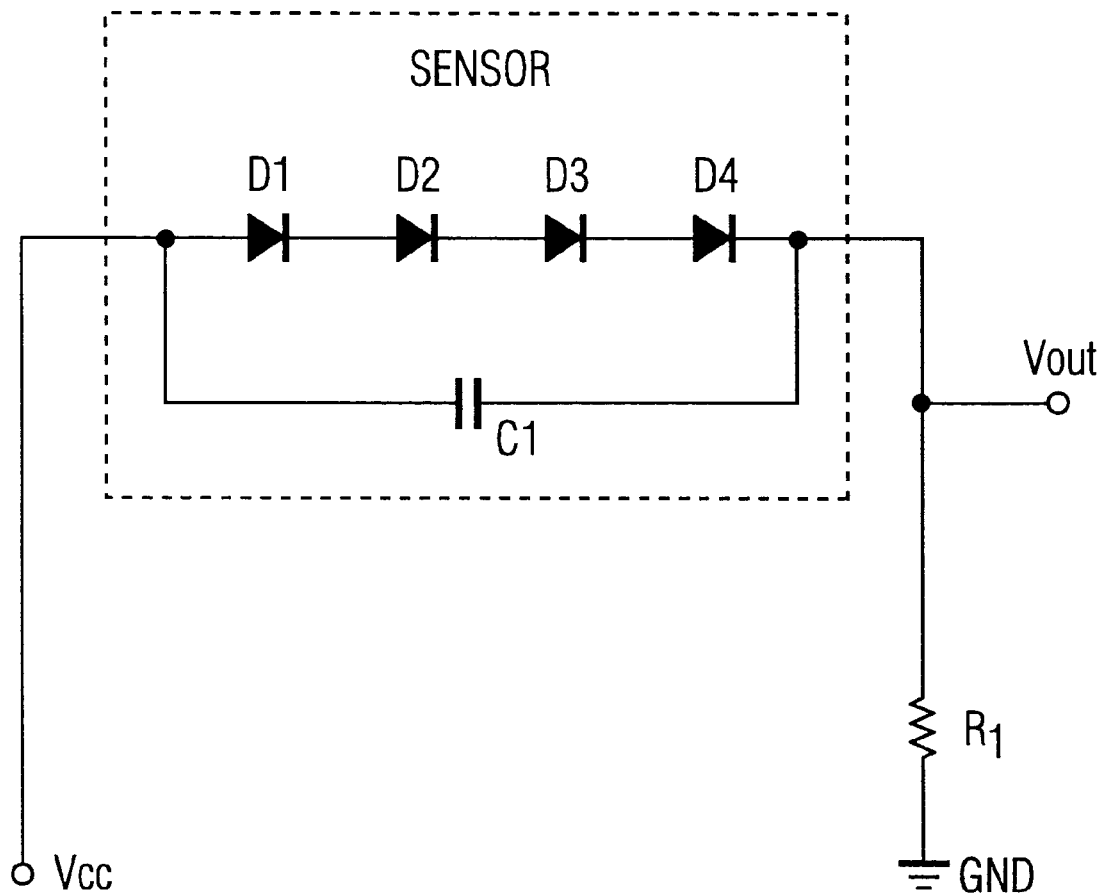
FIG. 1 shows a schematic diagram of a sensor according to the present invention.

The preferred embodiments will now be described by way of example, in which like reference numerals indicate like elements.

EXAMPLE 1

Referring now to FIG. 1, temperature sensor includes four forward biased diodes D1, D2, D3, D4 in series. High frequency noise is suppressed with capacitor C1. The diodes D1, D2, D3, D4 and capacitor C1 are housed in a common package. The diodes are 1N4148 type. The capacitor C1 is a ceramic 0.001 $\mu$F type.

These diodes are biased such that they are unsaturated, and thus neither the diffusion nor recombination current component predominates the effect at room temperature. However, at temperature extremes, one or the other may predominate.

Therefore, in FIG. 1, resistor R1 and voltage source Vcc set the bias. Voltage source Vcc is set at 5V in this example. Resistor R1 is 35.5 k$\Omega$, and can be placed on either side of the diodes D1, D2, D3, D4. When the diode(s) D1, D2, D3, D4 are biased in the linear or saturated state, a current will pass. As the current flows through the semiconductor material of the diodes D1, D2, D3, D4, it produces a voltage drop Vout. This will be due to the resistance of the semiconductor "bulk" material and the p-n Junction characteristics. The effective resistance of the semiconductor material of the diodes D1, D2, D3, D4 will change as the ambient temperature changes. Accordingly, the voltage drop split between the diodes D1, D2, D3, D4 and resistor R1 will also change, thus creating a voltage per temperature relationship.

It is understood that the diodes D1, D2, D3, D4 are placed in series to increase the output level to a desired range, and therefore any number of diodes may be used according to the application. As the number of diodes is increased, the amount of voltage change per °C. will be greater, thus improving measuring resolution. C1 is optional and is included only for filtering purposes.

Figure 2:
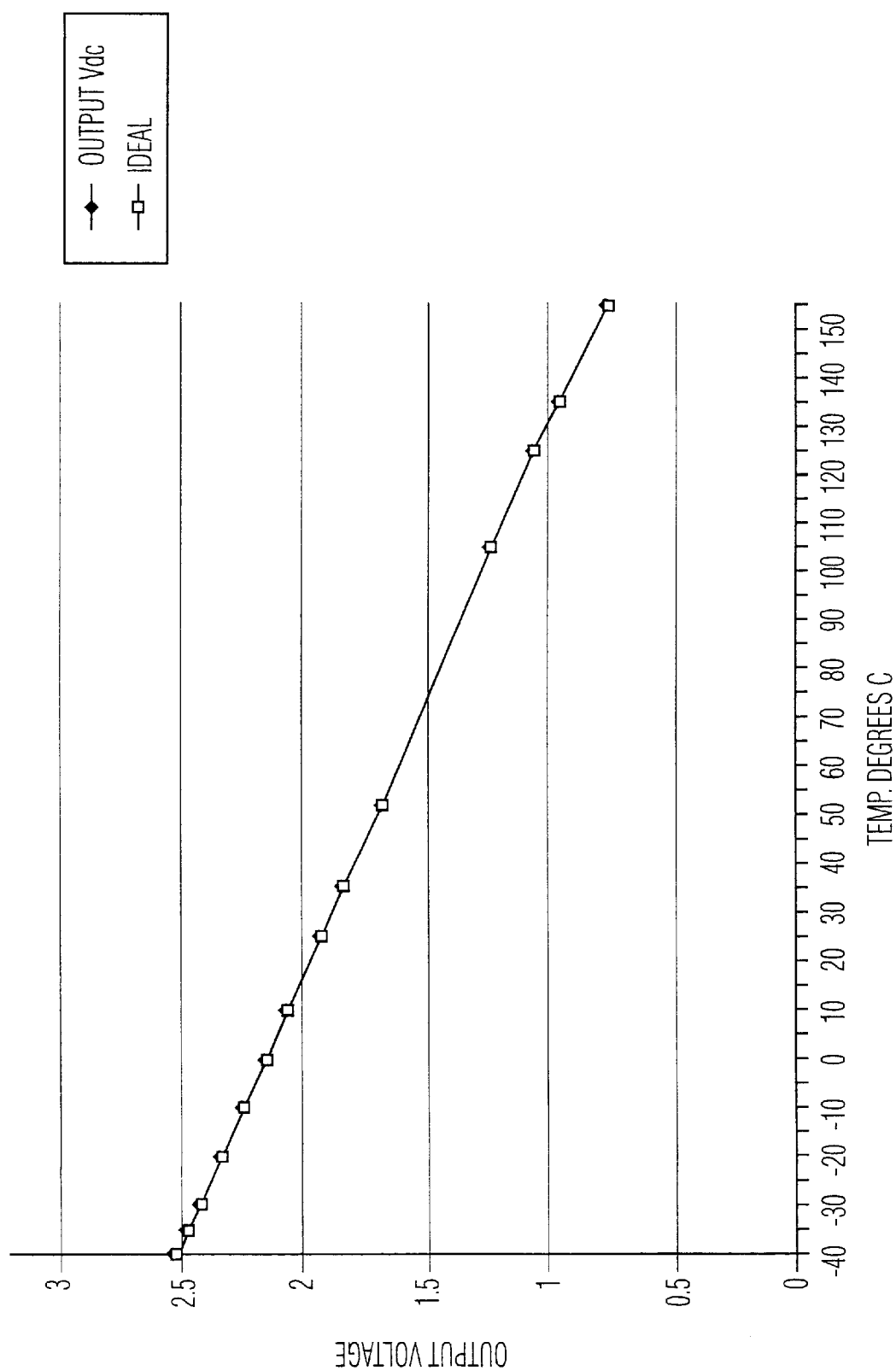
FIG. 2 shows a graph of performance of a preferred embodiment of the sensor according to the present invention.

In the present example, the current at room temperature is 85 $\mu$A, varying from 72.6 $\mu$A at −40° C. to 124.6 $\mu$A at +150° C., for resistor R1 equal 35.5 k$\Omega$ and voltage Source Vcc equal to 5 V DC. Table 1 shows the performance of this sensor, while FIG. 2 shows a magnified graph of voltage drop vs. temperature performance, showing the temperature test range of −40° C. to +150° C., a 190° range. This sensing device can operate from −65° C. to +200° C.

TABLE 1

| Abs. | Actual Range | Ideal | Delta T $V_{DC}$ | $V_{DC}$/deg C. | Actual $V_{DC}$ | Error $V_{DC}$ | Error % indicated |
|---|---|---|---|---|---|---|---|
| 190 | 150 | 0.776580 | 1.75162 | 0.009219053 | 0.77658 | 0 | 0 |
| 170 | 130 | 0.960961 | 1.75162 | | 0.9605 | −0.00046 | −0.047978285 |
| 160 | 120 | 1.053152 | 1.75162 | | 1.0569 | 0.003748 | 0.355924173 |
| 140 | 100 | 1.237533 | 1.75162 | | 1.2444 | 0.006867 | 0.55492423 |
| 90 | 50 | 1.698485 | 1.75162 | | 1.709 | 0.010515 | 0.619065533 |
| 75 | 35 | 1.836771 | 1.75162 | | 1.846 | 0.009229 | 0.502454966 |
| 65 | 25 | 1.928962 | 1.75162 | | 1.9356 | 0.006638 | 0.344144804 |
| 50 | 10 | 2.067247 | 1.75162 | | 2.0680 | 0.000753 | 0.036407427 |
| 40 | 0 | 2.159438 | 1.75162 | | 2.158 | −0.00144 | −0.066586529 |
| 30 | −10 | 2.251628 | 1.75162 | | 2.251 | −0.00063 | −0.027909625 |
| 20 | −20 | 2.343819 | 1.75162 | | 2.343 | −0.00082 | −0.034940727 |
| 10 | −30 | 2.436009 | 1.75162 | | 2.438 | 0.001991 | 0.081712585 |
| 5 | −35 | 2.482105 | 1.75162 | | 2.482 | −0.0001 | −0.004219679 |
| 0 | −40 | 2.528200 | 1.75162 | | 2.5282 | 0 | 0 |

Table 2 demonstrates the performance of the sensor according to the present invention with various series resistors, and therefore at different forward current operating points. As shown, linearity is good for series resistors R1 of 5 kΩ, 10.7 kΩ, 17.81 kΩ and 35.5 kΩ.

controller 1 having a multiplexer 5 and digital to analog converter 6 for receiving the temperature sensor inputs, and an actuator 8 for controlling a system. One of the temperature sensors 7 is connected by cable 9 to a microcontroller housing 2, while the other temperature sensor 5 resides

TABLE 2

| Series R | LTS Sample # | −25° C. | 0° C. | 25° C. | 50° C. | 75° C. | 100° C. | 125° C. | 150° C. | 175° C. |
|---|---|---|---|---|---|---|---|---|---|---|
| | Ideal | 2.4132 | 2.1819 | 1.9506 | 1.7193 | 1.488 | 1.2567 | 1.0254 | 0.7941 | 0.5628 |
| 35.623k | 1 | 2.4053 | 2.1790 | 1.9590 | 1.7356 | 1.5049 | 1.2694 | 1.0291 | 0.7941 | 0.5656 |
| 17.811k | 1 | 2.5273 | 2.3019 | 2.0856 | 1.8673 | 1.6498 | 1.427 | 1.1989 | 0.9695 | |
| 10.7k | Ideal | 2.5938 | 2.3811 | 2.1684 | 1.9557 | 1.7431 | 1.5304 | 1.3177 | 1.105 | |
| 10.7k | | 2.5938 | 2.3786 | 2.1671 | 1.9593 | 1.7513 | 1.5391 | 1.3233 | 1.105 | |
| 5k | Ideal | 2.7111 | 2.5102 | 2.3093 | 2.1084 | 1.9075 | 1.7066 | 1.5057 | 1.3048 | |
| 5k | | 2.7111 | 2.5069 | 2.3045 | 2.1052 | 1.9080 | 1.7105 | 1.5092 | 1.3048 | |
| 35.623k | 2 | 2.4009 | 2.1775 | 1.954 | 1.7307 | 1.4994 | 1.2635 | 1.0246 | 0.7879 | 0.5599 |
| 17.811k | 2 | 2.5213 | 2.2967 | 2.081 | 1.8621 | 1.6447 | 1.422 | 1.1939 | 0.964 | |
| 35.623k | 3 | 2.4036 | 2.1762 | 1.9528 | 1.7298 | 1.4992 | 1.2634 | 1.0238 | 0.7891 | 0.5627 |
| 17.811k | 3 | 2.5183 | 2.294 | 2.079 | 1.8607 | 1.644 | 1.4216 | 1.1944 | 0.9645 | |
| 35.623k | 4 | 2.3948 | 2.1726 | 1.9522 | 1.7299 | 1.4996 | 1.2632 | 1.0219 | 0.7888 | 0.5604 |
| 17.811k | 4 | 2.5186 | 2.2935 | 2.0783 | 1.8605 | 1.6431 | 1.4196 | 1.1921 | 0.9629 | |
| 35.623k | 5 | 2.4045 | 2.1765 | 1.9525 | 1.7283 | 1.4977 | 1.2612 | 1.0223 | 0.7854 | 0.558 |
| 17.811k | 5 | 2.5211 | 2.2953 | 2.0791 | 1.8613 | 1.6432 | 1.4196 | 1.192 | 0.962 | |
| 35.623k | 6 | 2.399 | 2.175 | 1.9521 | 1.7287 | 1.498 | 1.262 | 1.0221 | 0.7866 | 0.5594 |
| 17.811k | 6 | 2.5191 | 2.2938 | 2.079 | 1.8613 | 1.6429 | 1.42 | 1.1918 | 0.962 | |
| | I Ideal | 7.262E−05 | 7.911E−05 | 8.560E−05 | 9.209E−05 | 9.859E−05 | 1.051E−04 | 1.116E−04 | 1.181E−04 | 1.246E−04 |
| | R Ideal | 33232 | 27581 | 22787 | 18669 | 15093 | 11959 | 9190 | 6726 | 4518 |
| 35.623k | I Real #1 | 7.284E−05 | 7.919E−05 | 8.537E−05 | 9.164E−05 | 9.811E−05 | 1.047E−04 | 1.115E−04 | 1.181E−04 | 1.245E−04 |
| 35.623k | R Real #1 | 33023 | 27516 | 22948 | 18940 | 15338 | 12121 | 9232 | 6726 | 4544 |
| | Delta R | −210 | −65 | 161 | 271 | 245 | 162 | 42 | 0 | 25 |

| | Deg. C. | −25 | 0 | 25 | 50 | 75 | 100 | 125 | 150 | |
|---|---|---|---|---|---|---|---|---|---|---|
| 17k | Err % of 175° | −0.5 | −0.2 | 0.5 | 1.0 | 1.0 | 0.8 | 0.2 | 0.0 | 0.2 |
| 17k | Err ° C. Ind. | −0.9 | −0.3 | 0.9 | 1.8 | 1.8 | 1.4 | 0.4 | 0.0 | 0.3 |
| 10k | Err % of 175° | 0.0 | −0.2 | −0.1 | 0.2 | 0.6 | 0.6 | 0.4 | 0.0 | |
| 10k | Err ° C. Ind. | 0.0 | −0.3 | −0.2 | 0.4 | 1.0 | 1.0 | 0.7 | 0.0 | |
| 5k | Err % of 175° | 0.0 | −0.2 | −0.3 | −0.2 | 0.0 | 0.3 | 0.2 | 0.0 | |
| 5k | Err ° C. Ind. | 0.0 | −0.4 | −0.6 | −0.4 | 0.1 | 0.5 | 0.4 | 0.0 | |
| #2 | Err % of 175° | −0.8 | −0.3 | 0.2 | 0.7 | 0.7 | 0.4 | −0.0 | −0.4 | −0.2 |
| #2 | Err ° C. Ind. | −1.3 | −0.5 | 0.4 | 1.2 | 1.2 | 0.7 | −0.1 | −0.7 | −0.3 |
| #3 | Err % of 175° | −0.6 | −0.4 | 0.1 | 0.6 | 0.7 | 0.4 | −0.1 | −0.3 | −0.0 |
| #3 | Err ° C. Ind. | −1.0 | −0.6 | 0.2 | 1.1 | 1.2 | 0.7 | −0.2 | −0.5 | −0.0 |
| #4 | Err % of 175° | −1.1 | −0.6 | 0.1 | 0.7 | 0.7 | 0.4 | −0.2 | −0.3 | −0.1 |
| #4 | Err ° C. Ind. | −2.0 | −1.0 | 0.2 | 1.1 | 1.3 | 0.7 | −0.4 | −0.6 | −0.3 |
| #5 | Err % of 175° | −0.5 | −0.3 | 0.1 | 0.6 | 0.6 | 0.3 | −0.2 | −0.5 | −0.3 |
| #5 | Err ° C. Ind. | −0.9 | −0.6 | 0.2 | 1.0 | 1.0 | 0.5 | −0.3 | −0.9 | −0.5 |
| #6 | Err % of 175° | −0.9 | −0.4 | 0.1 | 0.6 | 0.6 | 0.3 | −0.2 | −0.5 | −0.2 |
| #6 | Err ° C. Ind. | −1.5 | −0.7 | 0.2 | 1.0 | 1.1 | 0.6 | −0.4 | −0.8 | −0.4 |
| 35.623k | Min/Max Error C | 1.1 | 0.4 | 0.7 | 0.8 | 0.7 | 0.9 | 0.8 | 0.9 | 0.8 |
| 17.811k | Min/Max Error C | 1.0 | 0.9 | 0.8 | 0.8 | 0.8 | 0.8 | 0.8 | 0.8 | 0.0 |

| | | Vdc Range | V/deg. C. | Vdc Range | V/deg. C. | | | | | |
|---|---|---|---|---|---|---|---|---|---|---|
| | 1 | 1.6112 | 0.0092 | 1.5578 | 0.0089 | 5937 ohm/0.1 mV | | | | |
| | 2 | 1.613 | 0.0092 | 1.5573 | 0.0089 | | | | | |
| | 3 | 1.6145 | 0.0092 | 1.5538 | 0.0089 | | | | | |
| | 4 | 1.6060 | 0.0092 | 1.5557 | 0.0089 | | | | | |
| | 5 | 1.6191 | 0.0093 | 1.5591 | 0.0089 | | | | | |
| | 6 | 1.6124 | 0.0092 | 1.5571 | 0.0089 | | | | | |
| 10K | | Vdc Range 1.4888 | V/deg. C. 0.00851 | | | | | | | |
| 5K | | Vdc Range 1.4063 | V/deg. C. 0.008036 | | | | | | | |

Figure 3:
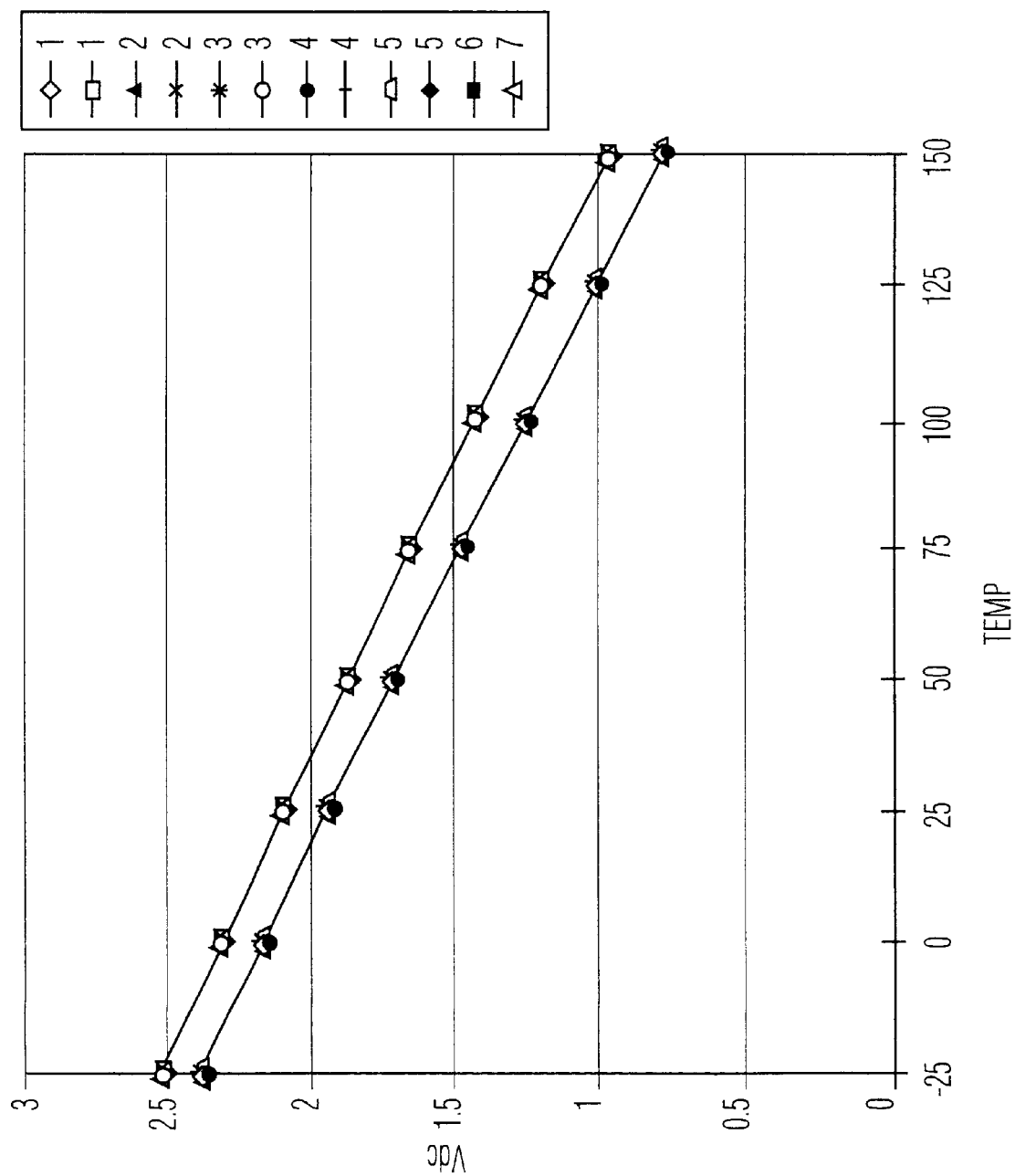
FIG. 3 shows a graph of performance of the sensor according to the present invention under various conditions of operation.

FIG. 3B graphs the performance of the sensors identified in FIG. 3A.

EXAMPLE 2

Figure 4:
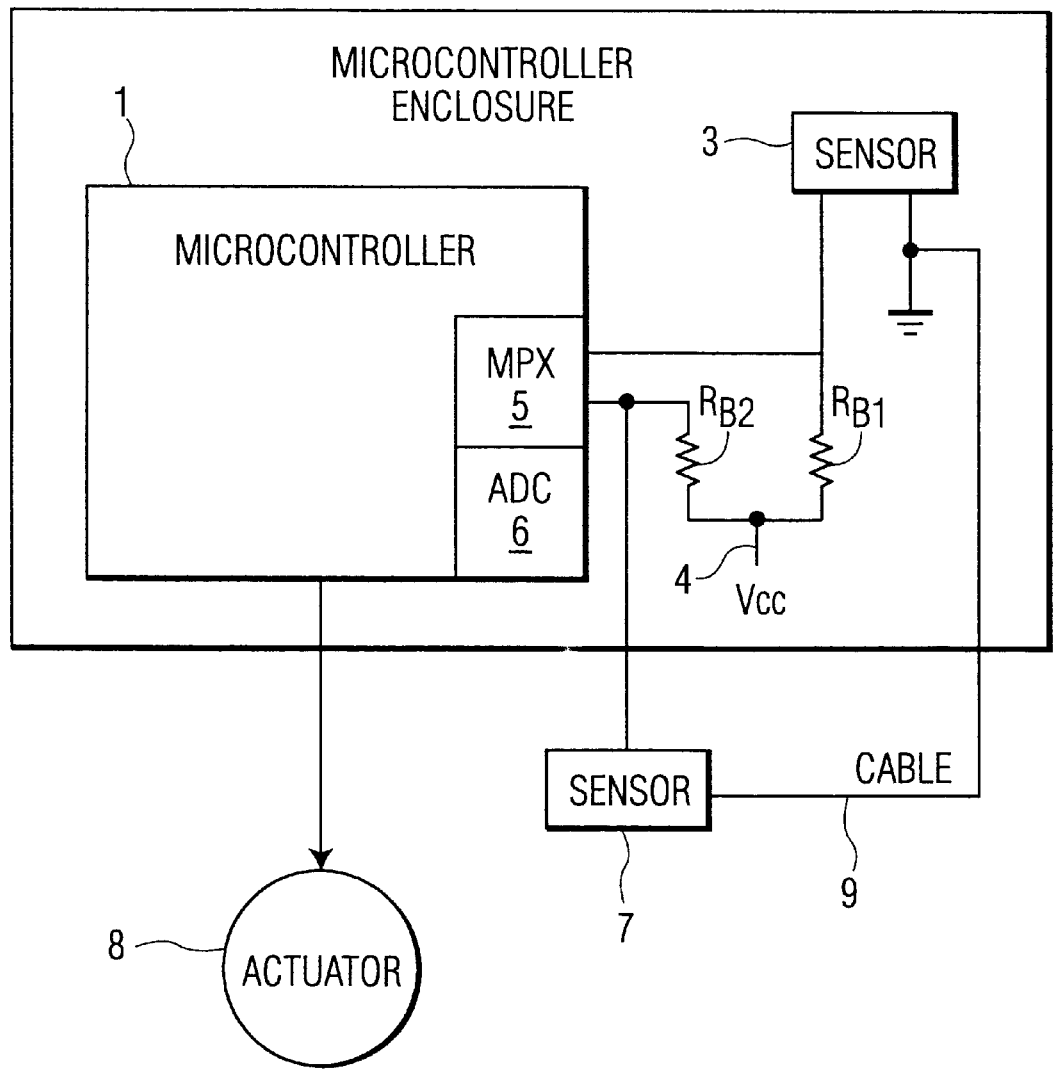
FIG. 4 shows a control system according to the present invention.
Figure 5:
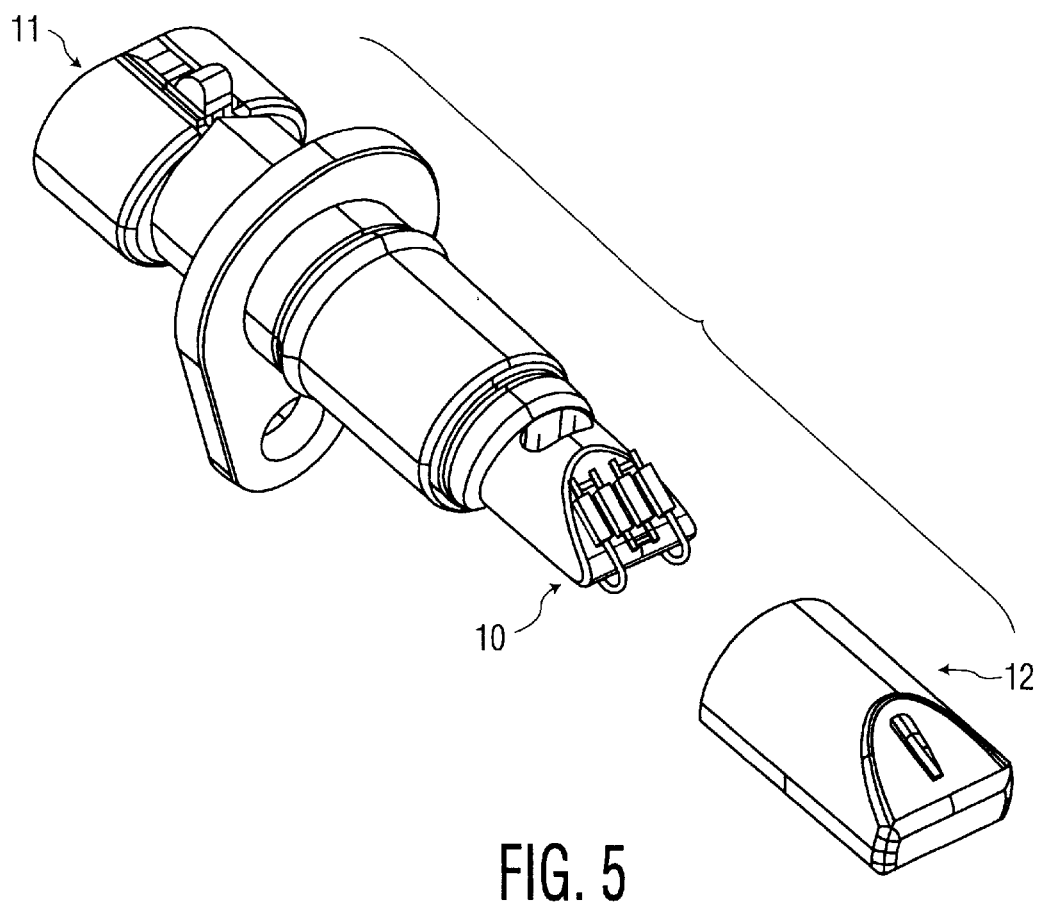
FIG. 5 shows a first embodiment of a sensor according to the present invention.

FIG. 4 shows a control system including a plurality of temperature sensors 5, 7, according to Example 1, a microwithin the microcontroller housing 2. Each temperature sensor 5, 7, has a respective bias resistor $R_{B1}$, $R_{B2}$ located within the microcontroller housing 2.

EXAMPLE 3

FIG. 4 shows a first embodiment of a sensor probe according to the present invention. The probe includes a set 10 of four 1N4148 diodes in series, at the tip of an assembly. A cap 12 fits over the set 10 of diodes. A connector 11 allows connection of a sensor cable to interface the sensor with a data acquisition system or control system. This design is suitable for sensing air temperatures.

Figure 6A:
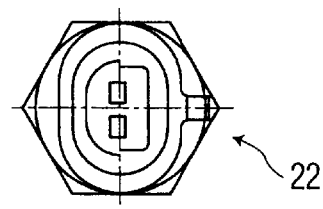
FIGS. 6A and 6B show, respectively, a partial cutaway front view and side view of a second embodiment of a sensor according to the present invention.
Figure 6B:
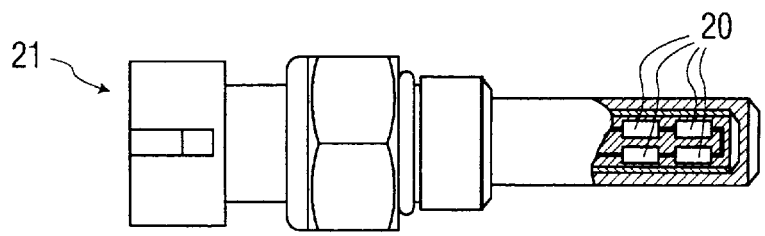

FIGS. 6A and 6B shows a top and partial cutaway side view of an alternate embodiment of the sensor, suitable for immersion in liquid. Inside the tip of the sensor probe, a set 20 of four 1N4148 diodes are provided in close proximity. The set 20 of diodes are set within a Mylar insulator and thermal grease is used to provide good thermal contact. An sealed connector 21 allows connection with a sensor cable. The connector 12 has two conductors within a sealing member 22, and is preferably a Metri-Pack 150 series Packard Connector, which mates with Packard Connector P/N 12040753.

Figure 7:
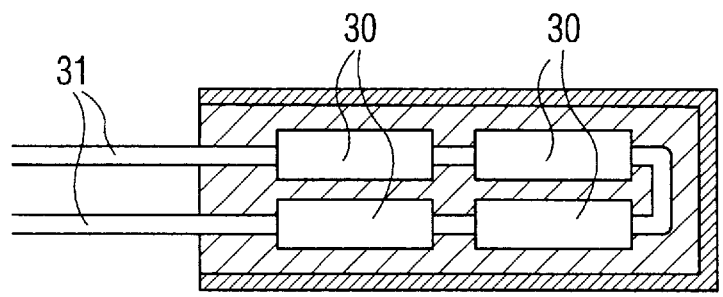
FIG. 7 shows a third embodiment of a sensor according to the present invention.

FIG. 7 shows a side cutaway view of a pill configuration sensor. The set 30 of four 1N4148 diodes in series are closely packed and cast in a small "bead" of thermally conductive potting compound. Two leads 31 exit the bead, and may be connectorized or wired as appropriate.

Figure 8:
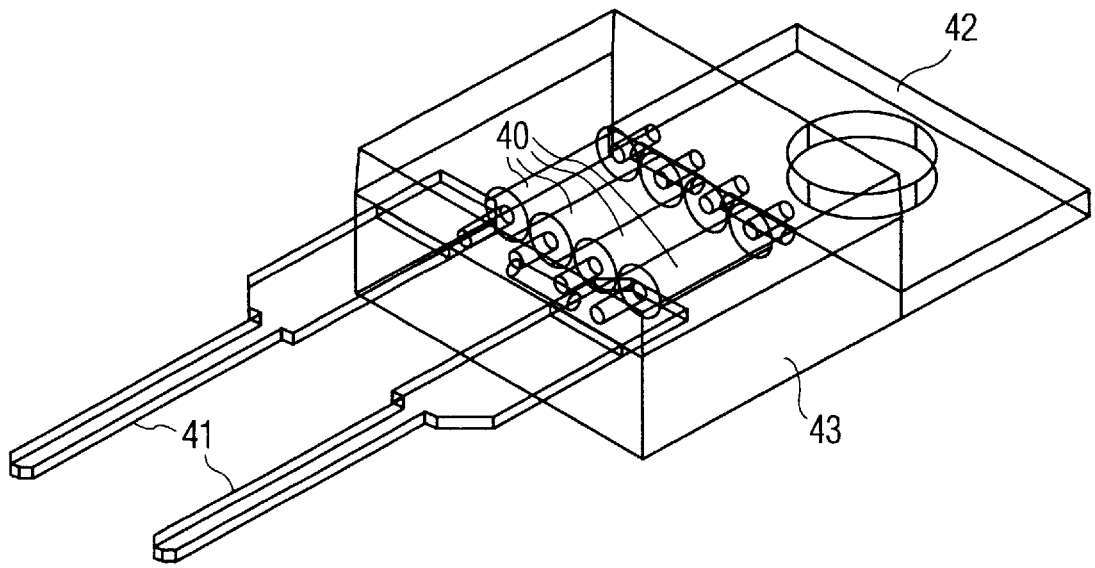

FIG. 8 shows a standard TO-220 package version of the linear temperature sensor. The set 40 of four 1N4148 diodes are wired in series to a wireframe, which for example includes a plurality of individual sensors during fabrication, and connected to a pair of leads 41. After the electrical connections are made, a thermally conductive polymer 43 is molded around the set of diodes 40 and a tab 43, to form the case. The set 40 of diodes are in close physical and thermal contact with the tab 42, which may be used for mounting in standard manner. After molding, the sensors are separated from the wireframe to provide individual packages sensors.

The invention may be embodied in other specific forms without departing from the spirit or essential characteristics thereof. The present embodiments are, therefore, to be considered in all respects as illustrative and not restrictive, the scope of the invention being indicated by the appended claims rather than by the foregoing description, and all changes which come within the meaning and range of equivalency of the claims are, therefore, intended to be embraced therein.

The term "comprising", as used herein, shall be interpreted as including, but not limited to inclusion of other elements not inconsistent with the structures and/or functions of the other elements recited.

What is claimed is:

1. In a control system having a temperature sensor, a control and an actuator, the improvement comprising said temperature sensor comprising a semiconductor junction having an exponential variation in voltage with respect to temperature at constant current, wherein a circuit acting as a low temperature coefficient constant impedance across a constant voltage is provided to alter a current passing through the junction to linearize an output response.

2. The control system according to claim 1, wherein a self-heating effect is provided due to the current which compensates for non-linear deviations over temperature.

3. The control system sensor according to claim 1, wherein the semiconductor junction comprises a silicon bipolar semiconductor.

4. The control system according to claim 1, wherein a plurality of separately packaged semiconductor diodes, each having a semiconductor junction, are provided in series.

5. The control system according to claim 1, wherein the temperature sensor comprises four type 1N4148 diodes in series with a resistor, having a voltage drop of around 2.0 volts at 25° C.

6. The control system according to claim 5, further comprising a capacitor in parallel with said diodes.

7. The control system according to claim 1, wherein the semiconductor junction is forward biased with a constant voltage through a constant impedance.

8. The control system according to claim 1, further comprising a second semiconductor junction in series with said semiconductor junction, both arranged to be forward biased.

9. The control system according to claim 1, wherein said exponential variation in voltage is approximated by the relation:

$$V_F \, ln(I_F) mkT/q$$

wherein the operating point is biased set such that the factor m offsets the change in forward current $I_F$ with temperature to produce a voltage drop split with a fixed resistor in series with a fixed voltage source which varies linearly with temperature.

10. The control system according to claim 9, wherein a self-heating effect is provided due to the forward current $I_F$ which compensates for non-linear deviations in sensor performance at low temperatures.

11. The control system according to claim 9, wherein the semiconductor junction comprises a bipolar a silicon semiconductor.

12. The control system according to claim 3, wherein the bipolar semiconductor comprises a type 1N4148 diode.

13. The control system according to claim 1, wherein the semiconductor junction comprises a series of diode junctions.

14. The temperature sensor according to claim 13, wherein the sensor comprises four type 1N4148 diodes in series with a resistor, having a voltage drop of around 2.0 volts at 25° C.

15. The control system according to claim 13, wherein the temperature sensor comprises four type 1N4148 diodes in series with a resistor having an impedance of about 35 kΩ and a series voltage source of about 5 volts DC, wherein said temperature sensor has a voltage drop of around 2.0 volts at 25° C.

16. The control system according to claim 9, further comprising a capacitor in parallel with said semiconductor junction.

17. The control system according to claim 1, wherein the temperature sensor comprises at least one forward biased bipolar diode in series with a fixed impedance, said at least one forward biased bipolar diode and fixed impedance being excited by a constant voltage, said fixed impedance and constant voltage being selected such that a voltage across the at least one forward biased bipolor diode varies linearly with temperature.

18. The control system according to claim 17, wherein the diodes comprise separately packaged silicon bipolar diodes.

19. The control system according to claim 1, wherein the semiconductor junction carries a current of between about 1–1000 μA at about 293° K.

20. The control system according to claim 19, wherein the semiconductor junction is part of a 1N4148 silicon diode or equivalent and the current is between about 25–250 μA at about 293° K.

* * * * *